(12) United States Patent
Lee et al.

(10) Patent No.: US 8,698,454 B2
(45) Date of Patent: Apr. 15, 2014

(54) CHARGING APPRARATUS FOR PORTABLE ELECTRONIC DEVICE

(75) Inventors: Chien-Hung Lee, New Taipei (TW); Shih-Chi Wong, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 390 days.

(21) Appl. No.: 13/184,582

(22) Filed: Jul. 18, 2011

(65) Prior Publication Data
US 2012/0249072 A1    Oct. 4, 2012

(30) Foreign Application Priority Data
Apr. 2, 2011    (CN) .......................... 2011 1 0083393

(51) Int. Cl.
*H02J 7/00*    (2006.01)
(52) U.S. Cl.
USPC ........................ 320/111; 320/107; 320/115
(58) Field of Classification Search
USPC ........................ 320/111, 107, 115; 362/185
See application file for complete search history.

(56) References Cited

U.S. PATENT DOCUMENTS

| | | | |
|---|---|---|---|
| 7,715,187 B2* | 5/2010 | Hotelling et al. | 361/679.41 |
| 2009/0174363 A1* | 7/2009 | Maher | 320/107 |
| 2009/0179610 A1* | 7/2009 | Lin | 320/101 |
| 2009/0202093 A1* | 8/2009 | Dannemann et al. | 381/323 |
| 2010/0060232 A1* | 3/2010 | Boyles et al. | 320/107 |
| 2010/0171464 A1* | 7/2010 | Choi | 320/114 |

FOREIGN PATENT DOCUMENTS

CN    2746433    12/2005

* cited by examiner

*Primary Examiner* — Yalkew Fantu
(74) *Attorney, Agent, or Firm* — Novak Druce Connolly Bove + Quigg LLP (57) ABSTRACT

A charging apparatus is used to support and charge an electronic device 90, and includes a holding portion, a rotating portion and an adjusting portion. The holding portion defines a receiving groove. The rotating portion is pivotedly received in the receiving groove to support the electronic device and fixed with a slave gear. The adjusting portion is fixed on the holding portion and includes a motor accompanying with a master gear engaging with the slave gear. The master gear is driven by the motor to rotate and subsequently dives the slave gear rotate causing the rotating portion to rotate relative to the holding portion by engagement between the master gear and the slave gear, so as to adjust an angle between the electronic device and the holding portion.

14 Claims, 8 Drawing Sheets

CHARGING APPRARATUS FOR PORTABLE ELECTRONIC DEVICE

BACKGROUND

1. Technical Field

The present disclosure relates to charging apparatuses, and more particularly to a charging apparatus for supporting a portable electronic device.

2. Description of Related Art

Commonly, a charging apparatus is specially designed for supporting and supplying power to portable electronic devices, such as tablet personal computers, cellular telephones, and other portable electronic devices. The charging apparatus typically defines a receiving groove to receive and to match with the portable electronic devices. An angle between the portable electronic device and the charging apparatus cannot be changed when the portable electronic device is being charged. Thus, it will be inconvenient that different portable electronic devices are charged by different special charging apparatuses.

Therefore, a need exists in the industry to overcome the described limitations.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
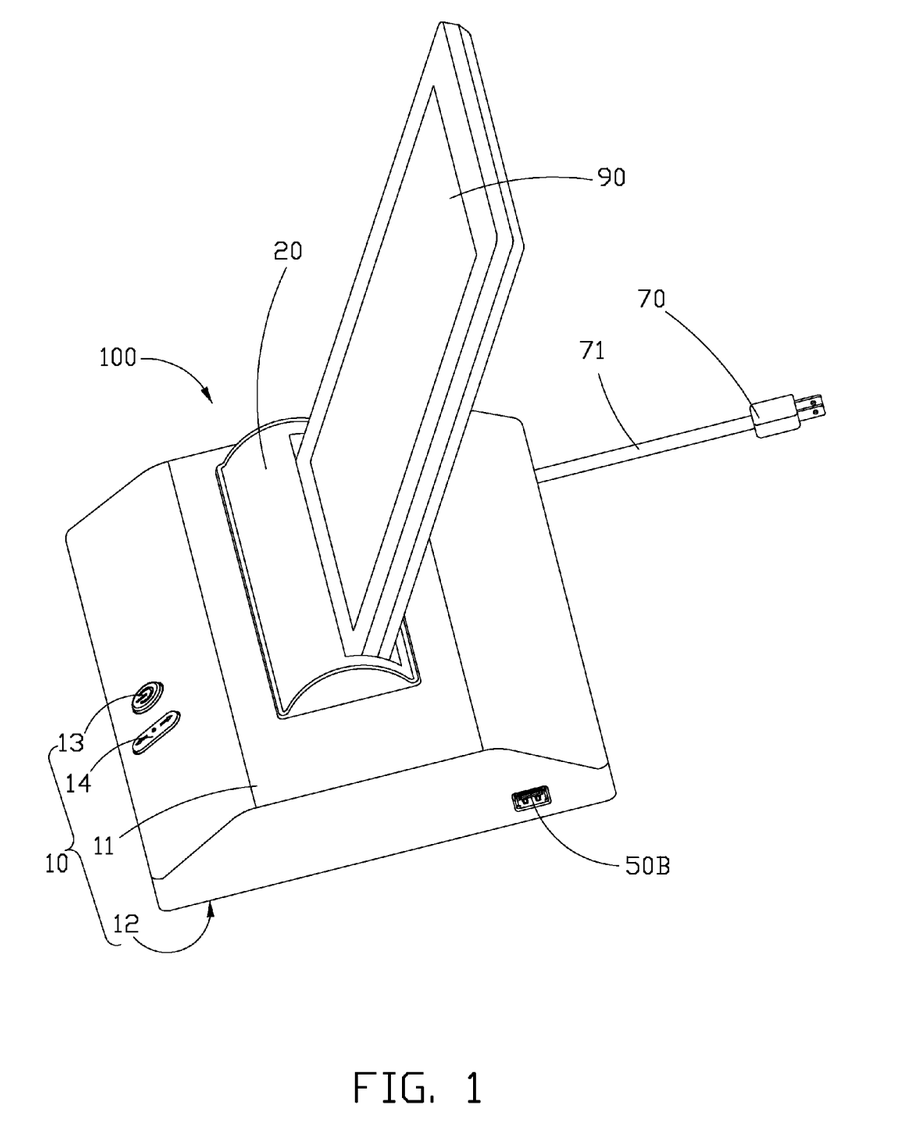
FIG. 1 is a perspective view of one exemplary embodiment of a charging apparatus when charging an electronic device in accordance with the present disclosure.
Figure 2:
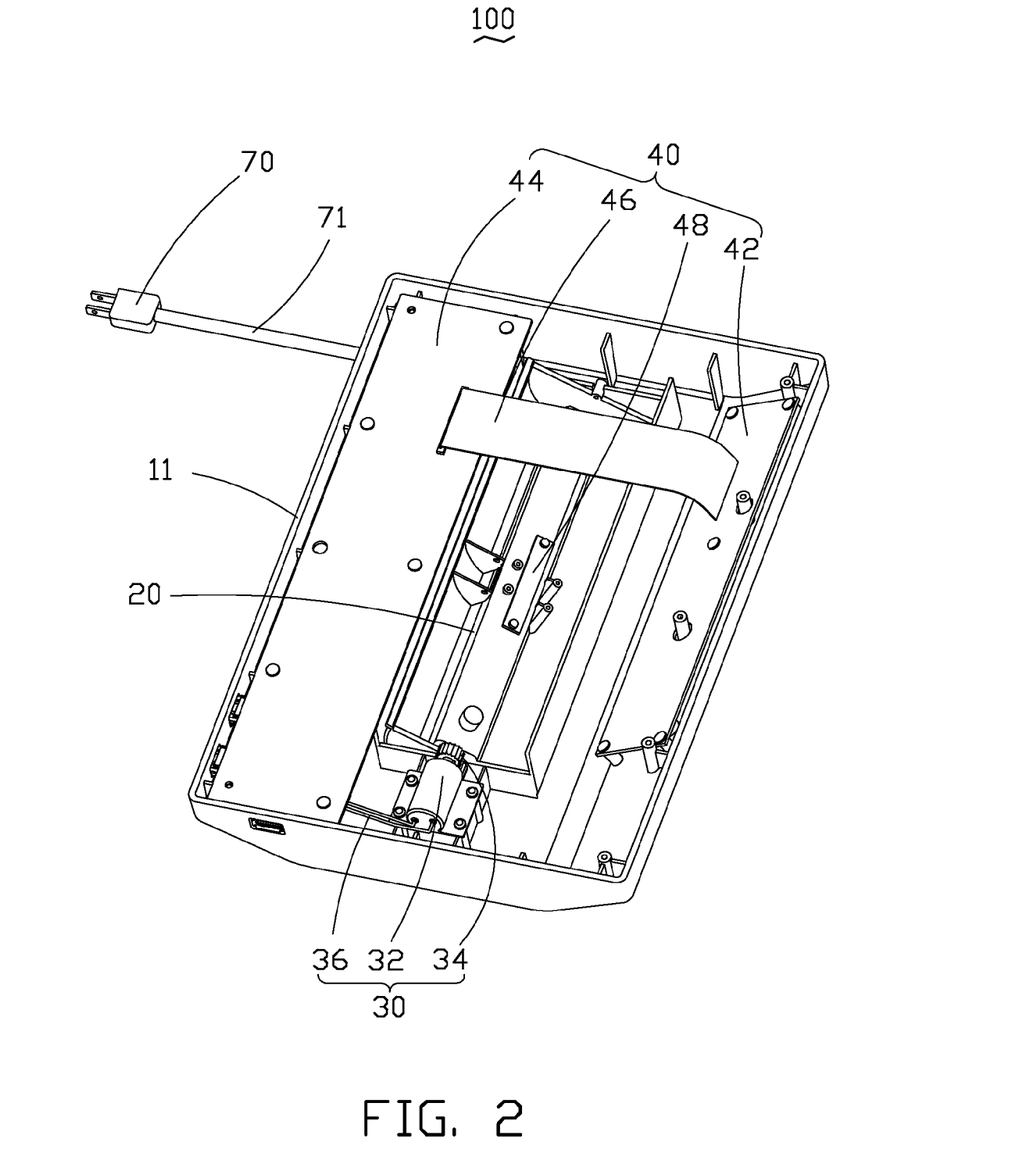
FIG. 2 is a perspective view of one exemplary embodiment of the charging apparatus of FIG. 1 without a bottom cover.

Referring to FIG. 1 and FIG. 2, a charging apparatus 100 is used to support and charge an electronic device 90, such as a tablet personal computer, cellular telephone and other portable electronic devices. The charging apparatus 100 comprises a holding portion 10, a rotating portion 20, an adjusting portion 30, a circuit board portion 40, and a power input terminal 70. The rotating portion 20 pivots on the holding portion 10 to receive and support the electronic device 90. The adjusting portion 30 is securely fixed on the holding portion 10 and engages with the rotating portion 20 to drive the rotating portion 20 rotate relative to the holding portion 10. The circuit board portion 40 is securely fixed in the holding portion 10 and electrically connected with the adjusting portion 30 and the power input terminal 70.

Figure 3:
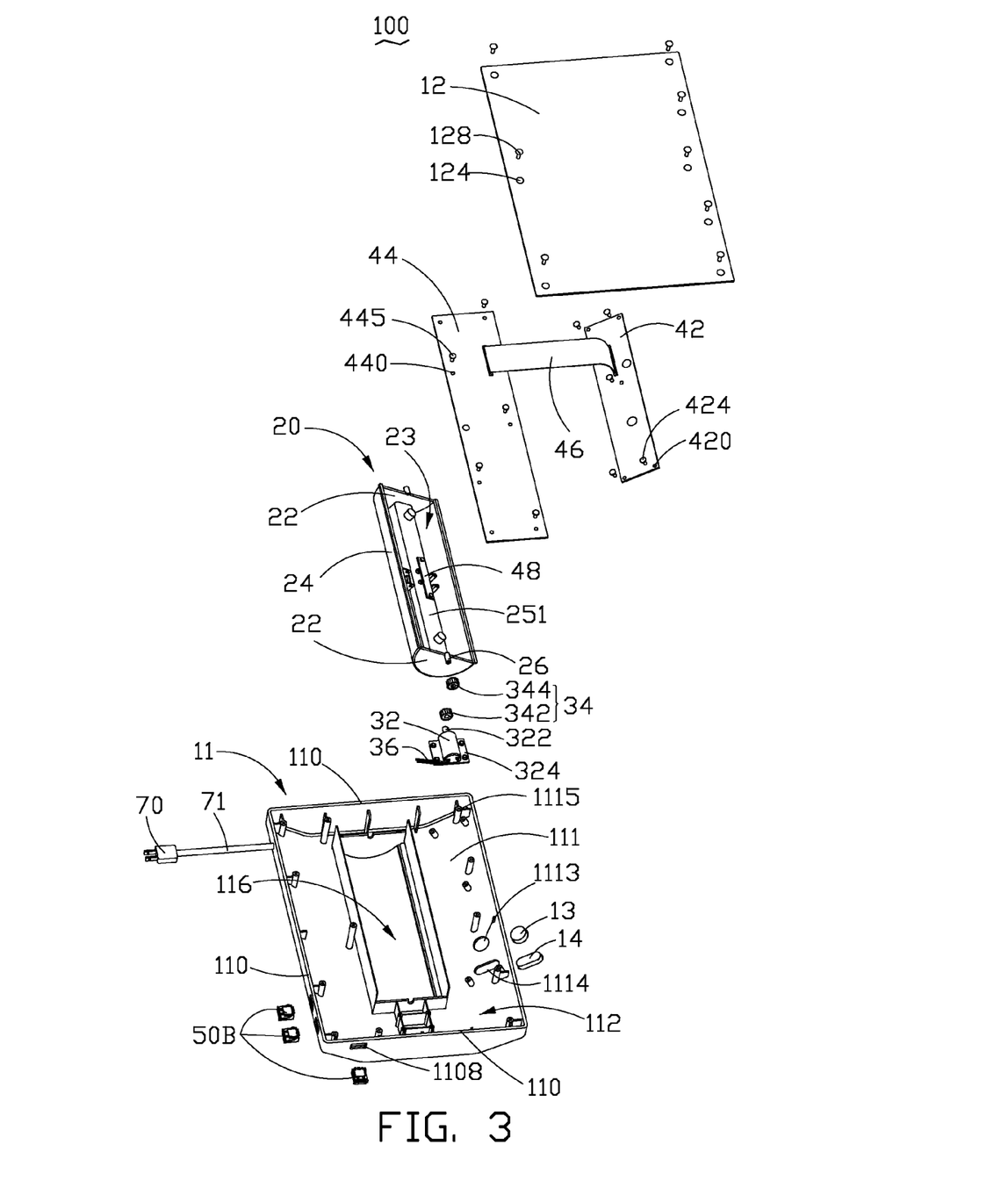
FIG. 3 is a disassembled perspective view of one exemplary embodiment of the charging apparatus of FIG. 1.

Referring to FIG. 3, the holding portion 10 comprises a holding cover 11, a bottom cover 12, a power button 13, and an adjusting button 14. The holding cover 11 accommodates the rotating portion 20, and the bottom cover 12 is securely fixed on the holding cover 11 to be opposite to the rotating portion 20. The power button 13 and the adjusting button 14 both pass through the holding cover 11 and electrically connect with the circuit board portion 40.

The holding cover 11 comprises a panel 111 and a plurality of first side walls 110 extending from edges of the panel 111 in a same direction. The panel 111 and the plurality of first side walls 110 cooperatively define a receiving space 112 to receive the adjusting portion 30 and the circuit board portion 40. In the illustrated embodiment, a cross section of the panel 111 is substantially U-shaped, and the receiving space 112 is substantially bowl-shaped.

Figure 4:
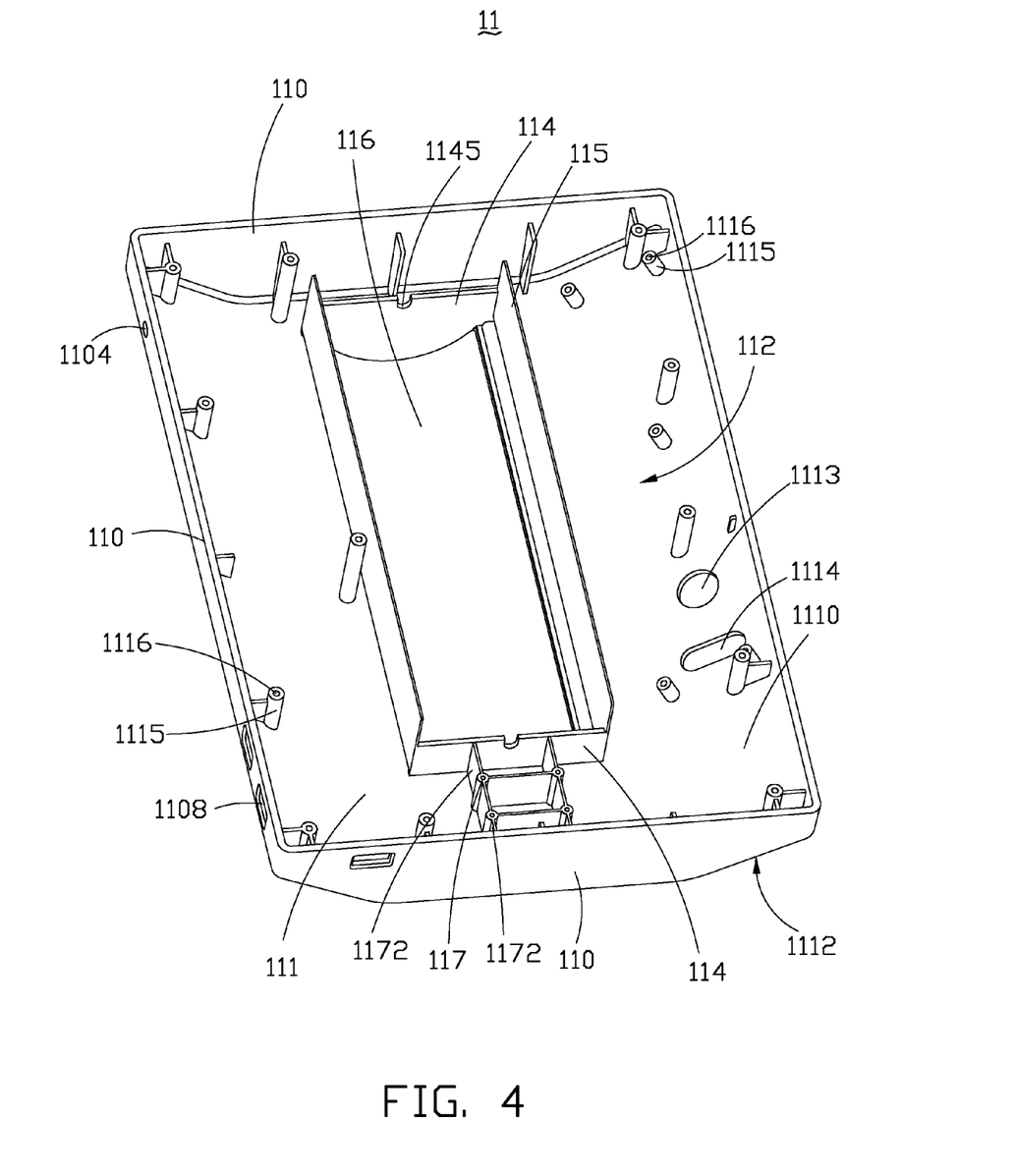
FIG. 4 is a perspective view of one exemplary embodiment of a holding cover of the charging apparatus of FIG. 1.

Also referring to FIG. 4, one of the plurality of first side walls 110 defines a through hole 1104 and an electrical wire 71 passes through the through hole 1104 to electrically connect the power input terminal 70 with the circuit board portion 40.

The panel 111 comprises a first surface 1110 and a second surface 1112 opposite to the first surface 1110. The first surface 1110 is formed on an inner surface of the holding cover 11 and the second surface 1112 is formed on an outer surface of the holding cover 11. The panel 111 defines a first receiving hole 1113 and a second receiving hole 1114 through the first surface 1110 and the second surface 1112. The power button 13 is inserted into the first receiving hole 1113 to electrically connect with the circuit board portion 40, and partially protrudes outwardly from the second surface 1112 for convenient operation. The adjusting button 14 is inserted into the second receiving hole 1114 to electrically connect with the circuit board portion 40, and partially protrudes outwardly from the second surface 1112 for convenient controlling and adjusting an angle between the electronic device 90 and the rotating portion 20.

The holding cover 11 further comprises a pair of second side walls 114 and a pair of third side walls 115 perpendicularly connecting with the pair of second side walls 114. The pair of second side walls 114 and the pair of third side walls 115 are respectively in parallel with the plurality of first side walls 110 and collectively define a receiving groove 116 extending from the first surface 1110 to the second surface 1112 to receive the rotating portion 20. Each of the pair of second side walls 114 not only perpendicularly extends from the first surface 1110 towards the receiving space 112, but also perpendicularly extends from the second surface 1112 away from the panel 111 and is substantially formed as a semicircle. Each of the pair of third side walls 115 perpendicularly extends from the first surface 1110 towards the receiving space 112. In the illustrated embodiment, each of the pair of third side walls 115 is slightly higher than the corresponding second side walls 114 away from the first surface 1110 to conveniently mount the rotating portion 20.

The panel 111 comprises a plurality of protruding columns 1115 protruding from the first surface 1110 towards the receiving space 112. Each of the plurality of protruding columns 1115 defines a first fixing hole 1116 to securely fix the circuit board portion 40 and the bottom cover 12 on the holding cover 11. In the illustrated embodiment, the plurality of protruding columns 1115 is configured between the first side walls 110 and the third side walls 115 to mount the circuit board portion 40 between the first side walls 110 and the third side walls 115.

The bottom cover 12 covers the receiving space 112 and defines a plurality of second fixing holes 124. The bottom cover 12 is securely fixed on the holding cover 11 by a plurality of first screws 128 passing through the corresponding second fixing holes 124 and screwed in the corresponding first fixing holes 1116.

The holding cover 11 further comprises a fixing portion 117 protruding from the first surface 1110 and configured between one of the pair of second side walls 114 and the corresponding first side wall 110 so as to securely mount the adjusting portion 30. The fixing portion 117 comprises a plurality of strengthening walls 1172 to mechanically link the fixing portion 117 with the second side wall 114 and the corresponding first side wall 110 to strengthen the stability of the fixing portion 117.

In the illustrated embodiment, the plurality first side walls 110, the pair of second side walls 114, the pair of third side walls 115, the plurality of protruding columns 1115 and the fixing portion 117 are integrally formed with the panel 111.

Figure 5:
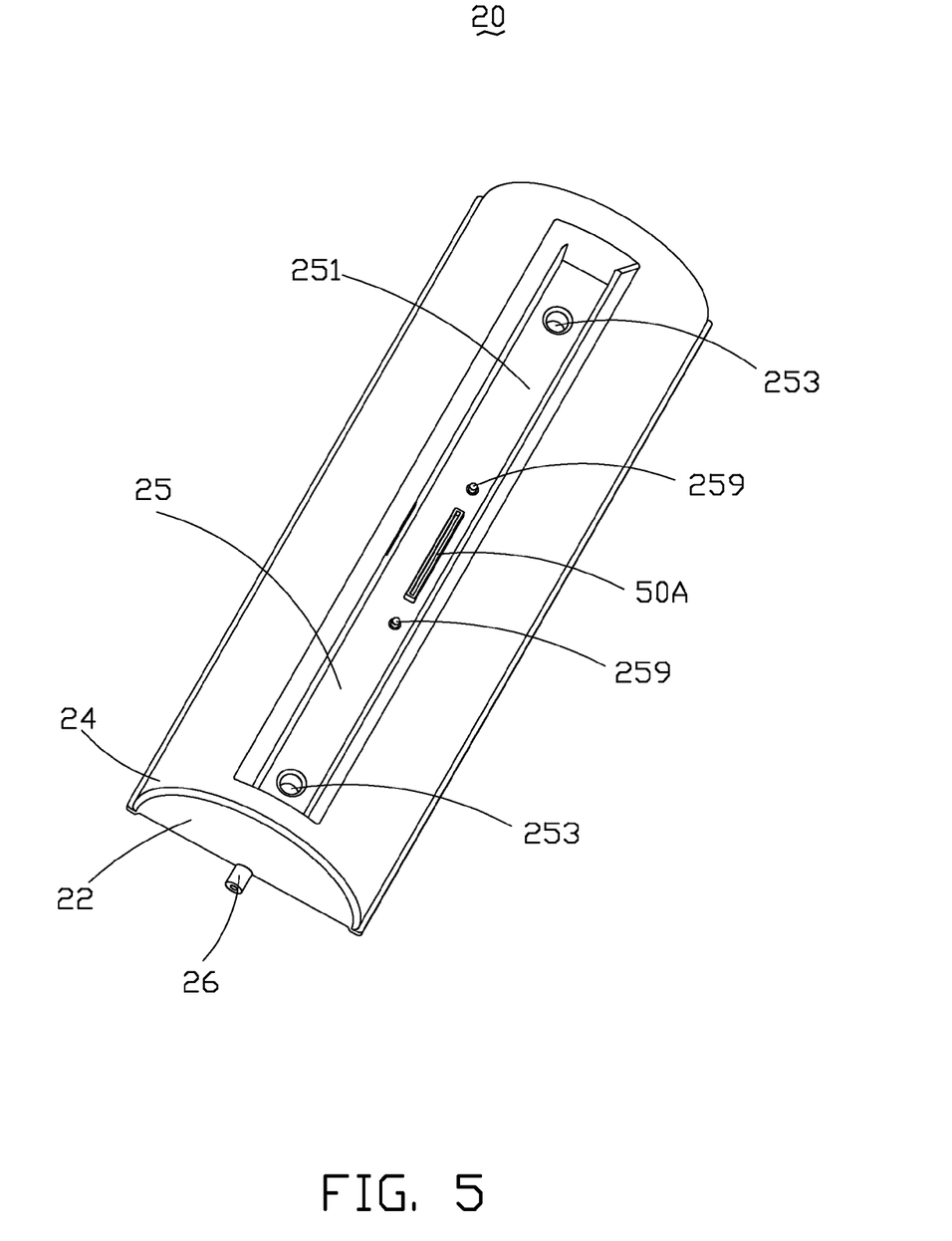
FIG. 5 is a perspective view of one exemplary embodiment of a rotating portion of the charging apparatus of FIG. 1.

Referring to FIG. 5, the rotating portion 20 is received in the receiving groove 116 of the holding portion 10, and comprises a rotating body 24 and a pair of side portions 22 on two sides of the rotating body 24. In the illustrated embodiment, the rotating body 24 is substantially formed as a half hollow cylinder, and each of the pair of side portions 22 is substantially formed as a semicircle. The rotating body 24 and the pair of side portions 22 are cooperatively formed a receiving cavity 23 opening to the same direction with the receiving space 112. Each of the pair of second side walls 114 defines a latching groove 1145 to engage with the rotating portion 20. In the illustrated embodiment, each of the latching grooves 1145 is substantially formed as a semicircle. The rotating portion 20 further comprises a pair of first rotating shafts 26 protruding outwardly from the corresponding side portions 22 to engage with the latching grooves 1145. The pair of first rotating shafts 26 engages with the corresponding latching grooves 1145 to rotatably mount the rotating portion 20 on the holding cover 11 with the rotating body 24 arching relative to the second surface 1112.

Figure 6:
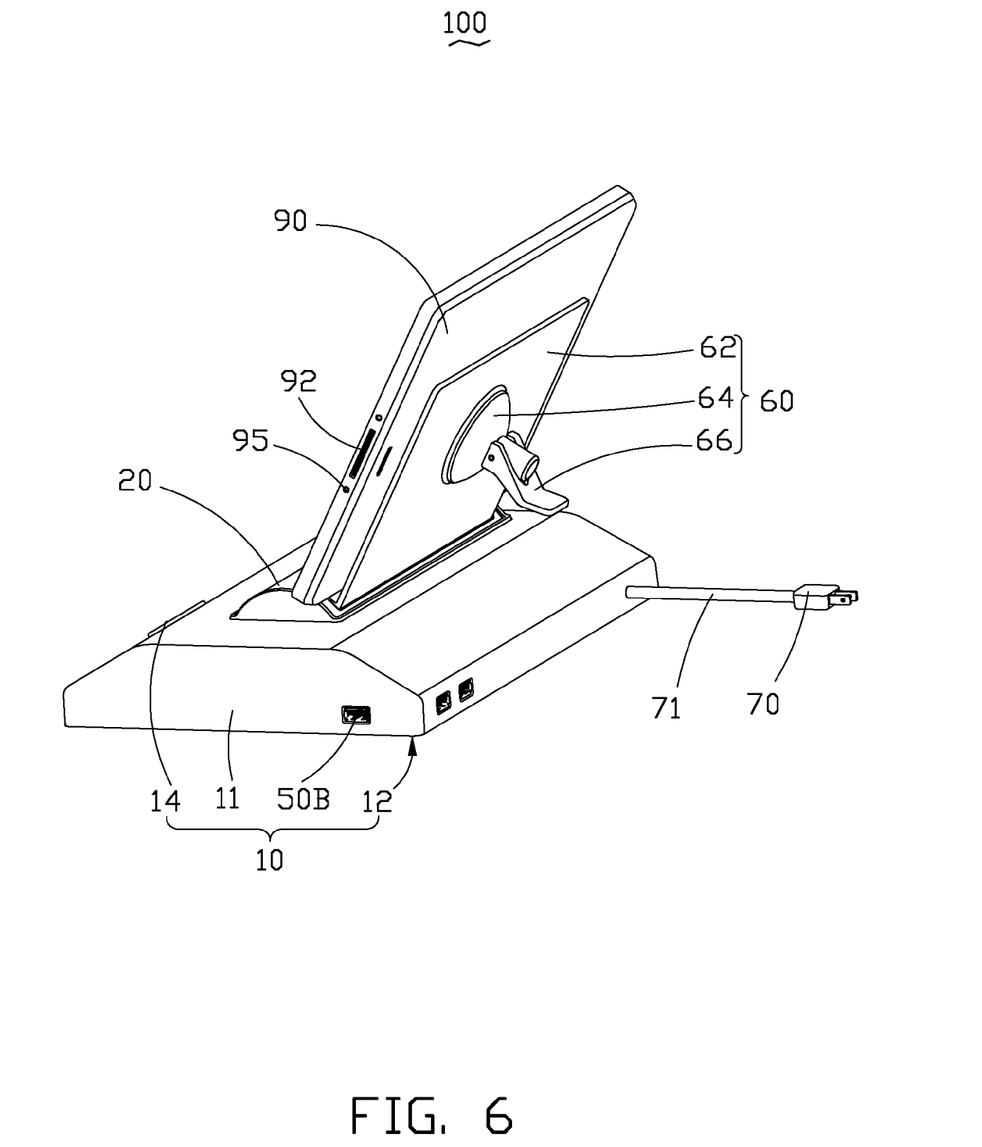
FIG. 6 is a perspective view of another exemplary embodiment of the charging apparatus when charging in accordance with the present disclosure.

The rotating body 24 defines a holding groove 25 in the middle thereof. A bottom side 251 formed in the holding groove 25 separates the holding groove 25 from the receiving cavity 23. The holding groove 25 is used to receive the electronic device 90, that is, the electronic device 90 is inserted in the holding groove 25 and electrically connected with the holding portion 10 to be charged. The rotating portion 20 comprises a pair of positioning columns 259 protruding from the bottom side 251 towards the holding groove 25 and an electrical connector 50A configured between the pair of positioning columns 259. The pair of positioning columns 259 engages with the fixing holes 95 of the electronic device 90 (as shown in FIG. 6) so as to stably and securely mount the electronic device 90 in the holding groove 25 of the rotating portion 20. Therefore, when the rotating portion 20 is rotated, the electronic device 90 can rotate with the rotating portion 20. In the illustrated embodiment, the electrical connector 50A is an output port of the charging apparatus 100 to electrically connect with the electronic device 90.

Referring to FIG. 3, the adjusting portion 30 is fixed in the receiving space 112 to drive the rotating portion 20 rotate relative to the holding portion 10. The adjusting portion 30 comprises a motor 32 and a gear portion 34. The motor 32 is securely mounted on the fixing portion 117 of the holding cover 11 via a securing seat 324, and electrically connects with the circuit board portion 40 via electrical wires 36. The motor 32 comprises a second rotating shaft 322 protruding outwardly from one side thereof to engage with the gear portion 34. In assembly, the second rotating shaft 322 faces to the second side wall 114 and is contiguous with the corresponding latching groove 1145. The gear portion 34 comprises a master gear 342 and a slave gear 344 engaging with the master gear 342. The master gear 342 is coiled around the second rotating shaft 322 to rotatably connect with the motor 32, and the slave gear 344 is coiled around the first rotating shaft 26 to rotatably connect with the rotating portion 20. In use, the motor 32 drives the master gear 342 rotate, and subsequently drives the slave gear 344 rotate, thus, the rotating portion 20 rotate relatively to the holding portion 10 by engagement between the master gear 342 and the slave gear 344 and the electronic device 90 rotates with the rotating portion 20, so as to adjust the angle between the electronic device 90 and the holding portion 10 when charging.

The circuit board portion 40 is securely mounted in the receiving space 112 of the holding cover 11, and comprises a first printed circuit board 42, a second printed circuit board 44 and a third printed circuit board 48. The first printed circuit board 42 defines a plurality of third fixing holes 420 and is securely fixed on one side of the holding cover 11. The first printed circuit board 42 is fixed between the first side wall 110 and the third side wall 115 by a plurality of second screws 424 passing through the corresponding third fixing holes 420 and screwed in the corresponding first fixing holes 1116. The second printed circuit board 44 defines a plurality of fourth fixing holes 440 and is securely fixed on the other side of the holding cover 11 opposite to the first printed circuit board 42. The second printed circuit board 44 is fixed between the first side wall 110 and the third side wall 115 by a plurality of third screws 445 passing through the corresponding fourth fixing holes 440 and screwed in the corresponding first fixing holes 1116. The third printed circuit board 48 is securely mounted on the bottom side 251 opposite to the pair of positioning column 259 to electrically connect with the electrical connector 50A.

The power input terminal 70 electrically connects with the second printed circuit board 44 to supply power to the charging apparatus 100. The motor 32 is electrically connects with the second printed circuit board 44 via the electrical wire 36 so as to drive the rotating portion 20. The first printed circuit board 42 electrically connects with the second printed circuit board 44 via a flat cable 46. The power button 13 and the adjusting button 14 electrically connect with the second printed circuit board 44, respectively. The third printed circuit board 48 electrically connects with the first printed circuit board 42, and an input interface 92 of the electronic device 90 (as shown in FIG. 6) connects with the electrical connector 50A to charge for the electronic device 90.

An exemplary installation process of the charging apparatus 100 will be described as below.

Firstly, the rotating portion 20 is received in the receiving groove 116 to be mounted in the holding portion 10 and the pair of first rotating shafts 26 engages with the corresponding latching grooves 1145, and the motor 32 is securely fixed on the fixing portion 117 via the securing seat 324 with the second rotating shaft 322 opposite to one of the pair of first rotating shafts 26. The master gear 342 sleeves on the second rotating shaft 322 to engage with the motor 32 and the slave gear 344 sleeves on the first rotating shaft 26 to engage with the rotating portion 20, and the master gear 342 engage with the slave gear 344 to mechanically connect the rotating portion 20 with the motor 32. Then, the first printed circuit board 42 is securely fixed in the receiving space 112 and electrically connects with the power button 13, the adjusting button 14, the electrical connector 50A and the third printed circuit board 48 secured on bottom side 251 opposite to receiving groove 25, and the second printed circuit board 44 is securely fixed in the receiving space 112 and electrically connects with the first printed circuit board 42 via flat cable 46, with the motor 32 via the electrical wire 36, and with the power input terminal 70. Finally, the bottom cover 12 covers on the open of the receiving space 112 and is secured on the holding cover 11 by a plurality of first screws 128 passing through the corresponding second fixing holes 124 and screwed in the corresponding first fixing holes 1116.

In use, the electronic device 90 is received in the holding groove 25 and the pair of positioning columns 259 engages with the fixing holes 95 to connect the input interface 92 with the electrical connector 50A. The electronic device 90 is charged by connecting the power input terminal 70 to the power supply and turning on the power button 13. The motor 32 is controlled by pressing the adjusting button 14 and drives the master gear 342 to rotate, and subsequently drives the slave gear 344 to rotate, thus the rotating portion 20 rotate relatively to the holding portion 10 by engagement between the master gear 342 and the slave gear 344. The electronic device 90 rotates with the rotating portion 20 to gain different angles when charging.

Referring to FIG. 6, if the size of the electronic device 90 is too big to be received in the holding groove 25 of the charging apparatus 100, a supporting seat 60 is provided to support the electronic device 90.

The difference between the charging apparatus 100 of the second exemplary embodiment and that of the first exemplary embodiment is that the charging apparatus 100 further comprises the supporting seat 60 to support the electronic device 90 in the second exemplary embodiment.

Figure 7:
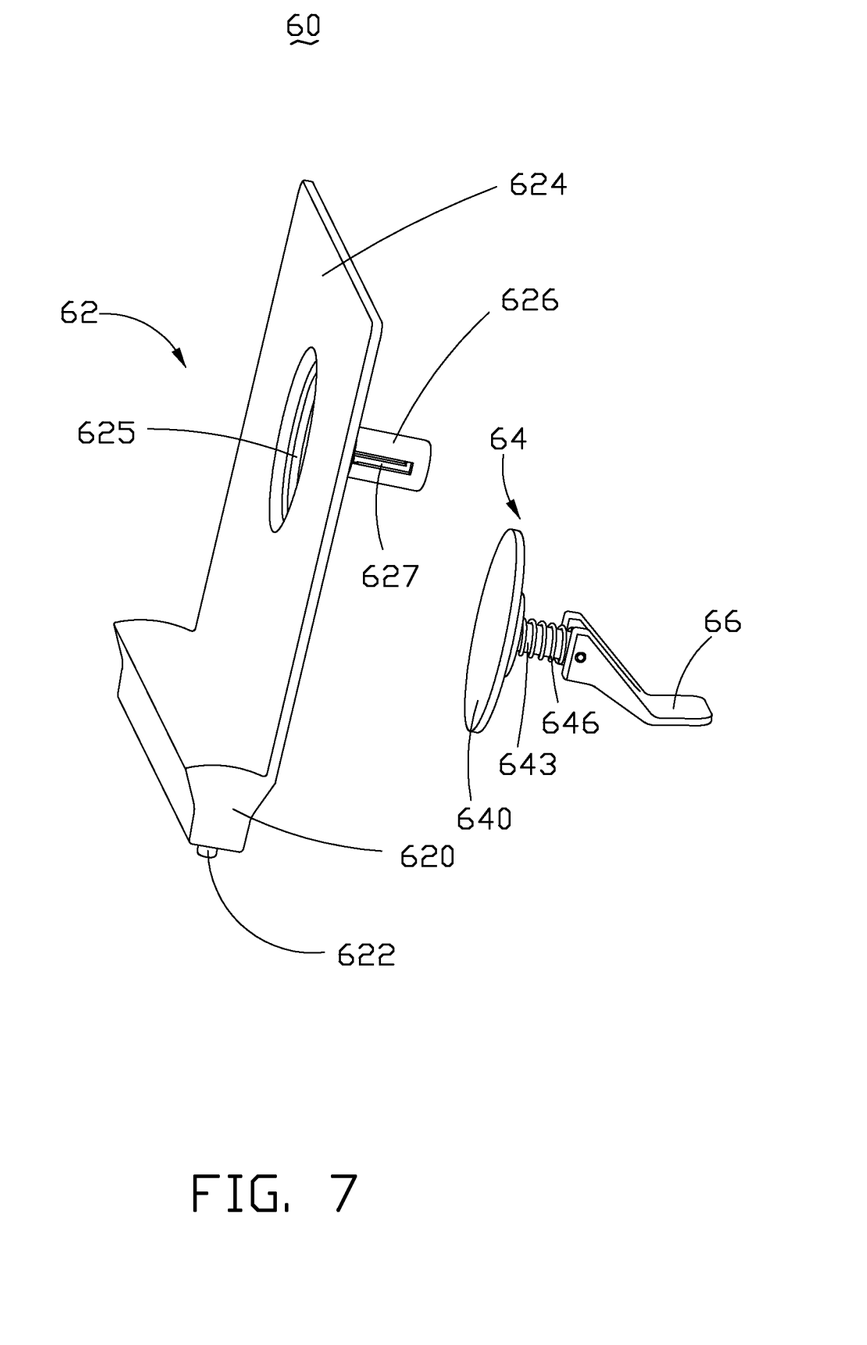
FIG. 7 is a perspective view of another exemplary embodiment of a supporting seat of the charging apparatus of FIG. 6.

Referring to FIG. 7, the supporting seat 60 is securely fixed in the holding groove 25 to rotate with the rotating portion 20, and comprises a depositing portion 62, a cupule portion 64 and a handle portion 66. The depositing portion 62 is used to hold the electronic device 90, and comprises a base portion 620, a leaning board 624 extending from the base portion 620, and a pair of fixing columns 622 protruding outwardly from the base portion 620 opposite to the leaning board 624. The rotating portion 20 defines a pair of positioning holes 253 (as shown in FIG. 5) on the bottom side 251 to engage with the corresponding fixing columns 622 so as to receive the base portion 620 in the holding groove 25 and to stably mount the depositing portion 62 in the rotating portion 20. Therefore, the supporting seat 60 is securely mounted in and rotates with the rotating portion 20. In the illustrated embodiment, the base portion 620 is integrally formed with the leaning board 624.

In the illustrated embodiment, the base portion 620 and the leaning board 624 are substantially L-shaped to hold the electronic device 90. The leaning board 624 defines a guiding hole 625 engaging with the cupule portion 64 and comprises a latching protrusion 626 protruding outwardly from the leaning board 624. The latching protrusion 626 and the base portion 620 are respectively configured on two opposite sides of the leaning board 624. The latching protrusion 626 defines a long groove 627 communicating with the guiding hole 625. The electronic device 90 is deposited on the base portion 620 and leaned against the leaning board 624 by the cupule portion 64 moving in the guiding hole 625 and absorbing the electronic device 90, so that the electronic device 90 is securely supported by the supporting seat 60.

Figure 8:
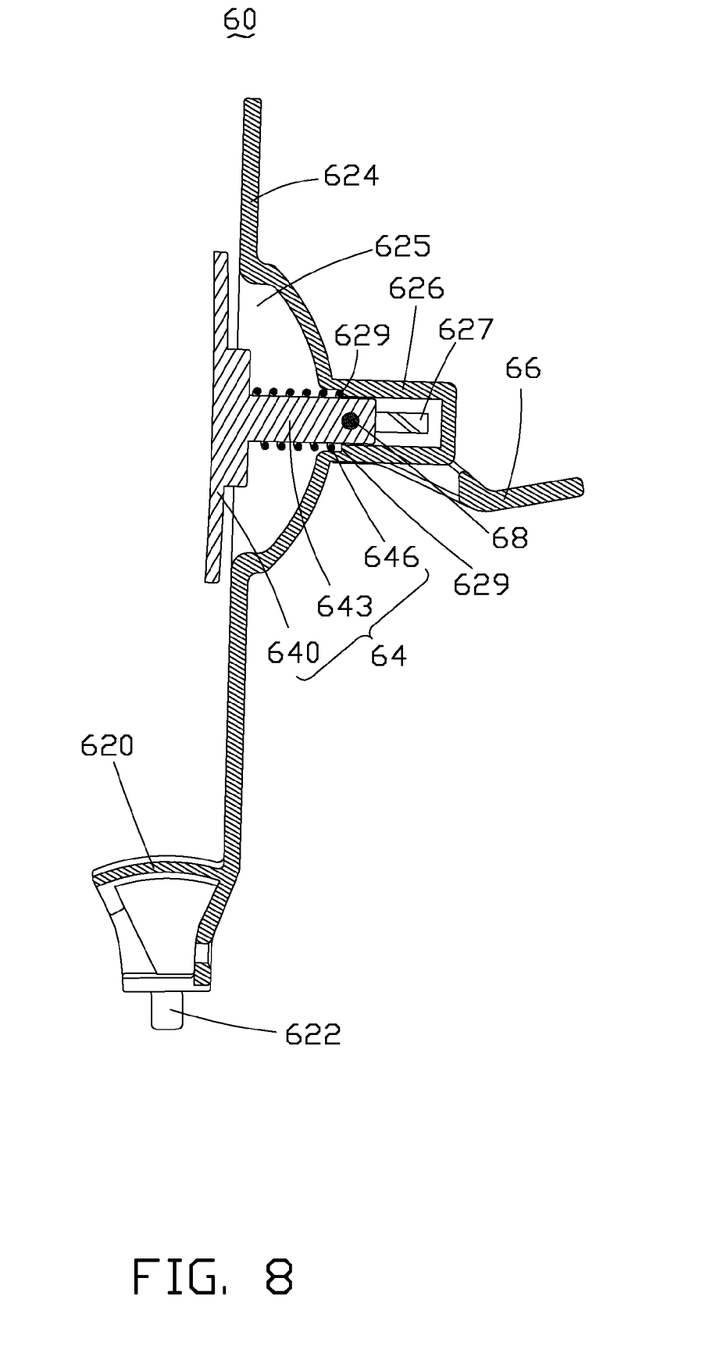
FIG. 8 is a sectional view of another exemplary embodiment of the supporting seat of the charging apparatus of FIG. 6.

Referring to FIG. 8, the cupule portion 64 is removably mounted on the depositing portion 62, and comprises a cupule body 640, a latching column 643 and a spring 646 configured on the latching column 643. The cupule body 640 engages with the guiding hole 625 to touch and absorb the electronic device 90. The latching column 643 protrudes outwardly from the cupule body 640 to securely mount with the handle portion 66. The leaning board 624 comprises a stopper portion 629 configured on a joint between the guiding hole 625 and the long groove 627 in the latching protrusion 626. The spring 646 is coiled around the latching column 643 and resists between the cupule body 640 and the stopper portion 629. The latching column 643 with the spring 646 is cooperatively inserted through the guiding groove 625 into the long groove 627, and the handle portion 66 is mounted on the latching column 643 by a pin 68 to move in the long groove 627. Therefore, the cupule portion 64 is movably mounted on the depositing portion 62. In use, the spring 646 is elastically mounted between the cupule body 640 and depositing portion 62 to urge the cupule portion 64 elastically moving in the long groove 627. The cupule body 640 touches and absorbs the electronic device 90 by pulling the handle portion 66 and compressing the spring 646 to move the latching column 643 in the long groove 627 away from the leaning board 624, and the cupule body 640 disengages from the electronic device 90 by pushing the handle portion 66 and stretching the spring 646 to move the latching column 643 in the long groove 627 towards the leaning board 624.

To a big size electronic device 90 which cannot be received in the holding groove 25, it is necessary to provide the supporting seat 60 to hold the electronic device 90 on the holding portion 10 and to provide a wired electrical connection between the electronic device 90 and the charging apparatus 100. The holding cover 11 defines a plurality of receiving openings 1108 on the first side walls 11 to receive electrical connectors 50B electrically connect with the second printed circuit board 44 (as show in FIG. 3 and FIG. 4) in the holding portion 10. One of the electrical connectors 50B electrically connects with the input interface 92 by an external wire to electrically connect the electronic device 90 with the charging apparatus 100, so that the electronic device 90 is in charging and the angle between the electronic device 90 and the holding portion 10 can be adjusted by operating the adjusting button 14.

In use, the electronic device 90 is deposited on the base portion 620 and is stably resisted on the leaning board 624 when the electronic device 90 is absorbed by the cupule body 640 by pulling the handle portion 66. Then, the electronic device 90 is electrically connected with the charging apparatus 100 by the wire connecting the electrical connector 50B with the input interface 92.

To be similar to the first exemplary embodiment, the electronic device 90 is charging by connecting the power input terminal 70 to the power supply and turning on the power button 13. The motor 32 is controlled by pressing the adjusting button 14 and drives the master gear 342 to rotate, and subsequently drives the slave gear 344 to rotate so as to urge the rotating portion 20 to rotate relatively to the holding portion 10. The electronic device 90 rotates with the supporting seat 60 securely fixed on the rotating portion 20 and gains different angles when charging.

The supporting seat 60 is designed for different models of electronic device 90 and is used to adjust the angle between the electronic device 90 and the holding portion 10 according to users' favor when charging.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A charging apparatus used to support and charge an electronic device, the charging apparatus comprising:
    a holding portion, defining a receiving groove;
    a rotating portion, pivotedly received in the receiving groove to support the electronic device, wherein the rotating portion is fixed with a slave gear; and
    an adjusting portion, fixed on the holding portion and comprising a motor accompanying with a master gear engaging with the slave gear, wherein the master gear is driven by the motor to rotate and subsequently drives the slave gear rotate causing the rotating portion to rotate relative to the holding portion by engagement between the master gear and the slave gear, so as to adjust an angle between the electronic device and the holding portion.

2. The charging apparatus as claimed in claim 1, wherein the holding portion comprises a panel, a plurality of first side walls extending from the panel, and a bottom cover, the panel and the plurality of first side walls cooperatively define a receiving space to receive the adjusting portion, the bottom cover is fixed on the plurality of first side walls above the receiving space.

3. The charging apparatus as claimed in claim 2, wherein the holding portion comprises a pair of second side walls and a pair of third side walls perpendicularly connecting with the pair of second side walls, the pair of second side walls and the pair of third side walls perpendicularly extend from the panel towards the receiving space respectively in parallel with the plurality of first side walls, and collectively define the receiving groove extending from the panel to receive the rotating portion.

4. The charging apparatus as claimed in claim 3, wherein each of the pair of second side walls defines a latching groove, the rotating portion comprises a pair of first rotating shafts engaging with the corresponding latching groove to rotatably mount the rotating portion on the holding portion.

5. The charging apparatus as claimed in claim 4, wherein the motor comprises a second rotating shaft protruding outwardly from thereof, the slave gear is coiled around one of the pair of first rotating shaft to rotatably connect with the rotating portion and the master gear is coiled around the second rotating shaft to rotatably connect with the motor.

6. The charging apparatus as claimed in claim 2, wherein the charging apparatus comprises a circuit board portion fixed in the receiving space, the holding portion comprises a power button and an adjusting button, the panel defines a first receiving hole and a second receiving hole, the power button is inserted into the first receiving hole and electrically connects to the circuit board portion, the adjusting button is inserted into the second receiving hole and electrically connects to the circuit board portion.

7. The charging apparatus as claimed in claim 1, wherein the rotating portion defines a holding groove to receive the electronic device, and comprises a pair of positioning columns and an electrical connector, a bottom side formed in the holding groove separates the holding groove from the receiving cavity, the pair of positioning columns protrudes from the bottom side towards the holding groove to engage with and stably mount the electronic device in the holding groove, the electrical connector is configured between the pair of positioning columns on the bottom side to electrically connect with the electronic device.

8. The charging apparatus as claimed in claim 7, further comprising a supporting seat securely fixed in the holding groove to rotate with the rotating portion, wherein the supporting seat comprises a base portion to hold the electronic device, a leaning board extending from the base portion, and a pair of fixing columns protruding outwardly from the base portion opposite to the leaning board, the leaning portion and the pair of fixing columns are integrally formed with the base portion.

9. The charging apparatus as claimed in claim 8, wherein the base portion and the leaning board are substantially L-shaped.

10. The charging apparatus as claimed in claim 8, wherein the rotating portion defines a pair of positioning holes on the bottom side to engage with the fixing columns so as to receive the base portion in the holding groove and to stably mount the supporting seat in the rotating portion.

11. The charging apparatus as claimed in claim 10, wherein the supporting seat comprises a cupule portion, the leaning board defines a guiding hole engaging with the cupule portion and comprises a latching protrusion protruding outwardly from the leaning board, the latching protrusion and the base portion are respectively configured on two opposite sides of the leaning board, so that the electronic device is deposited on the base portion and absorbed on the leaning board by the cupule portion.

12. The charging apparatus as claimed in claim 11, wherein the cupule portion comprises a cupule body and a latching column, the cupule body engages with the guiding hole to touch and absorb the electronic device, the latching protrusion defines a long groove communicating with the guiding hole, the latching column protrudes outwardly from the cupule body to accommodate in the guiding hole and to move in the long groove.

13. The charging apparatus as claimed in claim 12, wherein the leaning board comprises a stopper portion configured on a joint between the guiding hole and the long groove in the latching protrusion, the cupule portion comprises a spring coiled around the latching column to resist between the cupule body and the stopper portion, and a handle portion mounted on the latching column to move in the long groove.

14. The charging apparatus as claimed in claim 13, wherein the cupule body touches and absorbs the electronic device by pulling the handle portion and compressing the spring to move the latching column in the long groove away from the leaning board, and the cupule body disengages from the electronic device by pushing the handle portion and stretching the spring to move the latching column in the long groove towards the leaning board.

* * * * *